(12) United States Patent
Morris

(10) Patent No.: US 7,349,971 B2
(45) Date of Patent: Mar. 25, 2008

(54) SYSTEM FOR TRANSMITTING DATA UTILIZING MULTIPLE COMMUNICATION APPLICATIONS SIMULTANEOUSLY IN RESPONSE TO USER REQUEST WITHOUT SPECIFYING RECIPIENT'S COMMUNICATION INFORMATION

(75) Inventor: Robert Paul Morris, Raleigh, NC (US)

(73) Assignee: Scenera Technologies, LLC, Portsmouth, NH (US)

( * ) Notice: Subject to any disclaimer, the term of this patent is extended or adjusted under 35 U.S.C. 154(b) by 776 days.

(21) Appl. No.: 10/774,229

(22) Filed: Feb. 5, 2004

(65) Prior Publication Data
US 2005/0193117 A1 Sep. 1, 2005

(51) Int. Cl.
*G06F 15/16* (2006.01)
(52) U.S. Cl. ..................... 709/228; 709/227
(58) Field of Classification Search ............... 709/207, 709/206, 227, 228; 379/202.01, 88.12, 265.11; 715/751
See application file for complete search history.

(56) References Cited

U.S. PATENT DOCUMENTS

| | | | |
|---|---|---|---|
| 2004/0141594 A1* | 7/2004 | Brunson et al. | 379/88.12 |
| 2004/0172455 A1* | 9/2004 | Green et al. | 709/207 |
| 2004/0172456 A1* | 9/2004 | Green et al. | 709/207 |
| 2005/0100159 A1* | 5/2005 | Fink et al. | 379/265.11 |
| 2005/0166154 A1* | 7/2005 | Wilson et al. | 715/751 |
| 2006/0233338 A1* | 10/2006 | Punaganti Venkata | 379/202.01 |

* cited by examiner

Primary Examiner—Le Hien Luu (57) ABSTRACT

The present invention is related to a method for transmitting data utilizing a plurality of communication applications simultaneously in a communication device supporting the plurality of communication applications, and a communication device for implementing the method. The method according to the present invention includes establishing a first communication session between a user of the communication device and a recipient via a first communication application supported by the communication device, invoking a second communication application to transmit data to the recipient via the second communication application during a communication session concurrent with the first communication session, and, in response to invoking the second communication application, automatically retrieving communication information related to the recipient and necessary to establish the concurrent communication session via the second communication application.

38 Claims, 7 Drawing Sheets

Recipient Jane Smith

| Communication Application | Communication Information 302 |
|---|---|
| Phone | (999) 123-1233 |
| Email | janesmith@123.com |
| SMS | 9991231233@tmomail.net |
| MMS | 9991231233@tmomail.net |
| Picture Upload | http://snapfish.com/uploadsubmit?AlbumID=guest&file= |
| DocUpload | ftp://ftp.my.company.com/mydirectory/guest<br>userid=xxxx<br>password=yyyyyy |
| ProfileExchange | link:SMS |

SYSTEM FOR TRANSMITTING DATA UTILIZING MULTIPLE COMMUNICATION APPLICATIONS SIMULTANEOUSLY IN RESPONSE TO USER REQUEST WITHOUT SPECIFYING RECIPIENT'S COMMUNICATION INFORMATION

FIELD OF THE INVENTION

The present invention relates to networked communications, and more particularly to, a method and system for transmitting data utilizing a plurality of communication modes in a communication device simultaneously.

BACKGROUND OF THE INVENTION

Hand held communication devices, such as mobile telephones and PDAs, currently are adapted to incorporate a variety of functions and to support multiple mechanisms of communication. For example, a mobile phone can provide traditional wireless telephone functions, while also providing the ability for a user to capture digital images and the ability to transmit or receive captured images for display on the phone's LCD. Indeed, the modern mobile phone allows the user to send and receive text messages, audio and video clips, graphics and images via electronic mail, Short Message Service (SMS) or Multimedia Message Service (MMS), in addition to simply talking to another caller. It is foreseeable that advances in technology will produce personal communication devices that support even more mechanisms of information exchange, such as ftp and other types of direct connections.

Each communication mechanism is associated with a particular addressing scheme, such as a phone number for phone calls, an email address for electronic messages, or an http URL for posting images. The personal communication devices that support a wide range of communication mechanisms, generally treat each mechanism separately. This can present challenges for the user who wishes to exchange information that cannot be sent, or is inconvenient to send, over a single mechanism.

For example, the user may be speaking to a customer by phone and may want the customer to view a document. With the current communication device, the user would be required to implement two separate data exchange mechanisms, e.g. phone communication and electronic mail, and also would be required to know the caller's address scheme, e.g., phone number and email address, associated with each mechanism. In operation, the caller would use the communication device, e.g., mobile phone, to call the customer using the customer's phone number, terminate the call, setup the mobile phone to send an email message with the attached document, provide or select from the device's address book the customer's email address, transmit the email message, and reestablish the telephone call with the customer. Accordingly, while current communication devices support multiple communication mechanisms, utilizing such mechanisms is cumbersome and inefficient.

Accordingly, a need exists for a communication device that supports a plurality of communication mechanisms in an integrated manner such that the user can easily implement more than one mechanism simultaneously. The present invention addresses such a need.

SUMMARY OF THE INVENTION

The present invention is related to a method for transmitting data utilizing a plurality of communication applications simultaneously in a communication device supporting the plurality of communication applications, and a communication device for implementing the method. The method according to the present invention includes establishing a first communication session between a user of the communication device and a recipient via a first communication application supported by the communication device, invoking a second communication application to transmit data to the recipient via the second communication application during a communication session concurrent with the first communication session, and, in response to invoking the second communication application, automatically retrieving communication information related to the recipient and necessary to establish the concurrent communication session via the second communication application.

Through aspects of the present invention, communication information related to a recipient for all communication mechanisms supported by a device are integrated. Accordingly, the user is not required to know more than one address for the recipient because the device automatically associates the needed addresses and connection setup information to manage all other modes of communication supported by the device. In addition, the information exchange using the second mode of communication occurs concurrently with the initial communication session. Thus, the user's initial communication session continues without interruption.

DETAILED DESCRIPTION

The present invention relates to networked communications, and more particularly to, a method and system for transmitting data utilizing a plurality of communication modes in a communication device simultaneously. The following description is presented to enable one of ordinary skill in the art to make and use the invention and is provided in the context of a patent application and its requirements. Various modifications to the preferred embodiment and the generic principles and features described herein will be readily apparent to those skilled in the art. For example, while the preferred embodiment is described as a mobile phone, the principles described can also be applied to any communication device, such as a PDA, or laptop computer. Thus, the present invention is not intended to be limited to the embodiment shown but is to be accorded the widest scope consistent with the principles and features described herein.

According to a preferred embodiment of the present invention, a personal communication device, e.g., mobile phone, includes an integration module that integrates the various communication mechanisms (also referred to as "communication applications") supported by the mobile phone. The integration module allows the user to conduct a communication session with a recipient using a first mode of communication, and to initiate a second mode of communication during the communication session to transmit data to the recipient using that second mode. When the second communication mode is initiated, the integration module automatically retrieves communication information necessary to establish a concurrent communication session with the recipient using the second communication mode. Depending on the communication mode, the communication information can include phone numbers, email addresses, URLs for personal or business websites and web services, static and dynamic IP addresses, and the like. Because related communication information is automatically retrieved by the device, the user need only enter one address for the information recipient, e.g., to set up the initial communication session. The integration module automatically associates other addresses and connection setup information to manage all other modes of communication.

Figure 1:
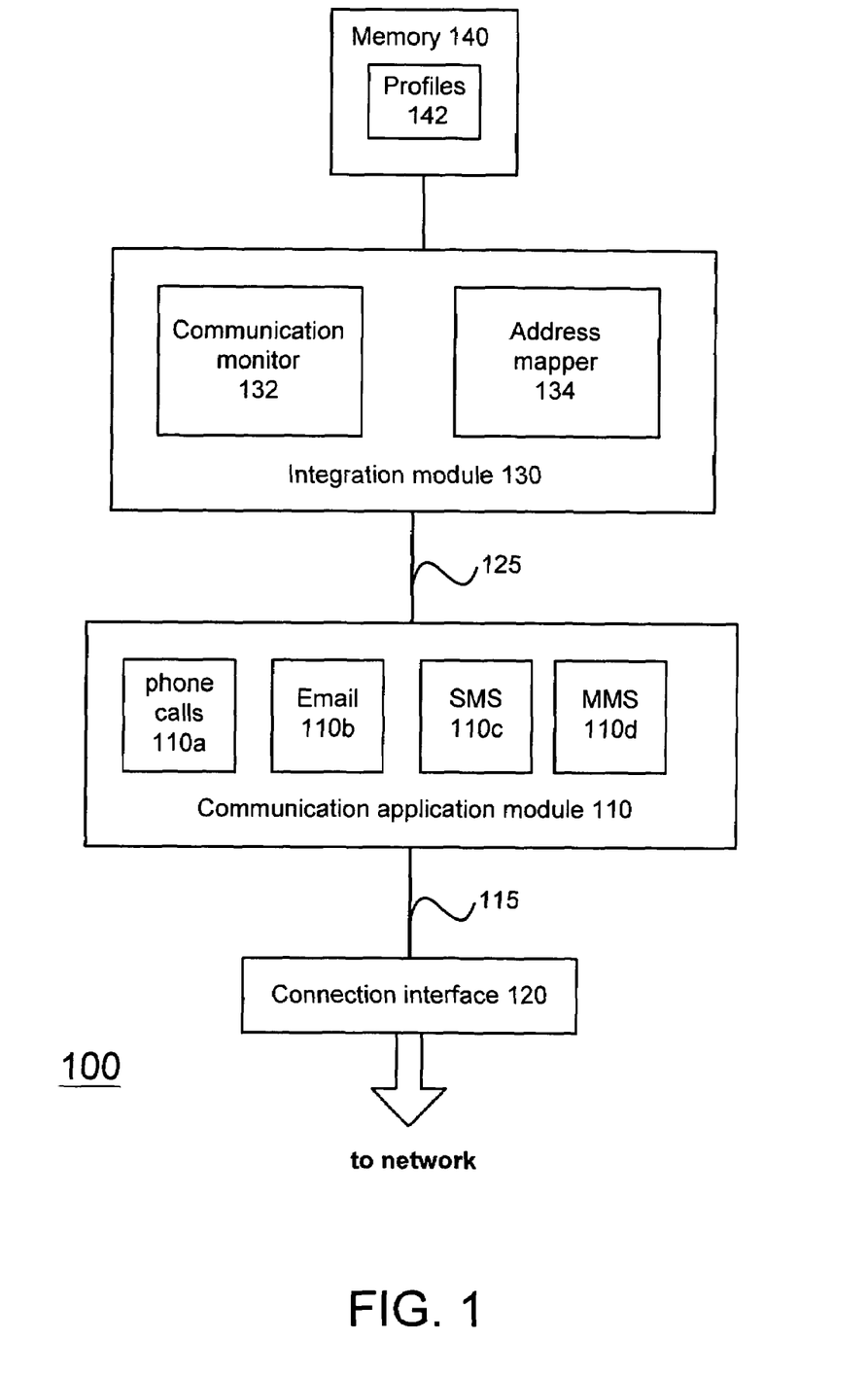
FIG. 1 is a block diagram illustrating the communication device according to a preferred embodiment of the present invention.

FIG. 1 is a block diagram illustrating the communication device according to a preferred embodiment of the present invention. The communication device 100 includes memory 140, an integration module 130, a communication application module 110 and a connection interface 120. Preferably, the communication device 100 is one that supports at least two communication modes, such as the following, for example:

Initiate and receive phone calls
Email
SMS
MMS
Initiate and receive direct network connections
Initiate and receive other datagram/packet type exchanges Each communication mode is controlled by a corresponding communication application 110a-110d in the communication application module 110. While four communication applications are shown in FIG. 1, those skilled in the art readily appreciate that other communication devices can support additional communication applications, and that the present invention is not intended to be limited in this manner. The communication application module 110 is in communication with the connection interface 120, via a bus 115, for example. The connection interface 120 enables data transmission to another communication device on a network (not shown). There are a number of standard connection interfaces 120 depending on the programming language used. Two such interfaces include a sockets interface for C/C++ program code and a java.net interface for Java program code for example. The connection interface 120 is well known to those skilled in the art and will not be further described here.

According to the preferred embodiment of the present invention, the communication device 100 also includes the integration module 130, which is in communication with the communication application module 110 via data bus 125 for example. The integration module 130 includes a communication monitor 132 and an address mapper 134. The communication monitor 132 is primarily responsible for detecting and identifying any communications that are ongoing at any given time. In a preferred embodiment, a communication application, e.g., the email application 110b, notifies the communication monitor 132 when the user invokes the application 110b, e.g., to transmit data via email. When the transmission is completed, the application, e.g., 110b, similarly informs the monitor 132. In this manner, the monitor 132 keeps track of which applications 110a-110d are being utilized at any given time. The address mapper 134 is primarily responsible for returning addresses and connection setup information, i.e., communication information, to a requesting communication application 110a-110d. Together, the communication monitor 132 and the address mapper 134 enable the device 100 to integrate its plurality of communication mechanisms.

Figure 2:
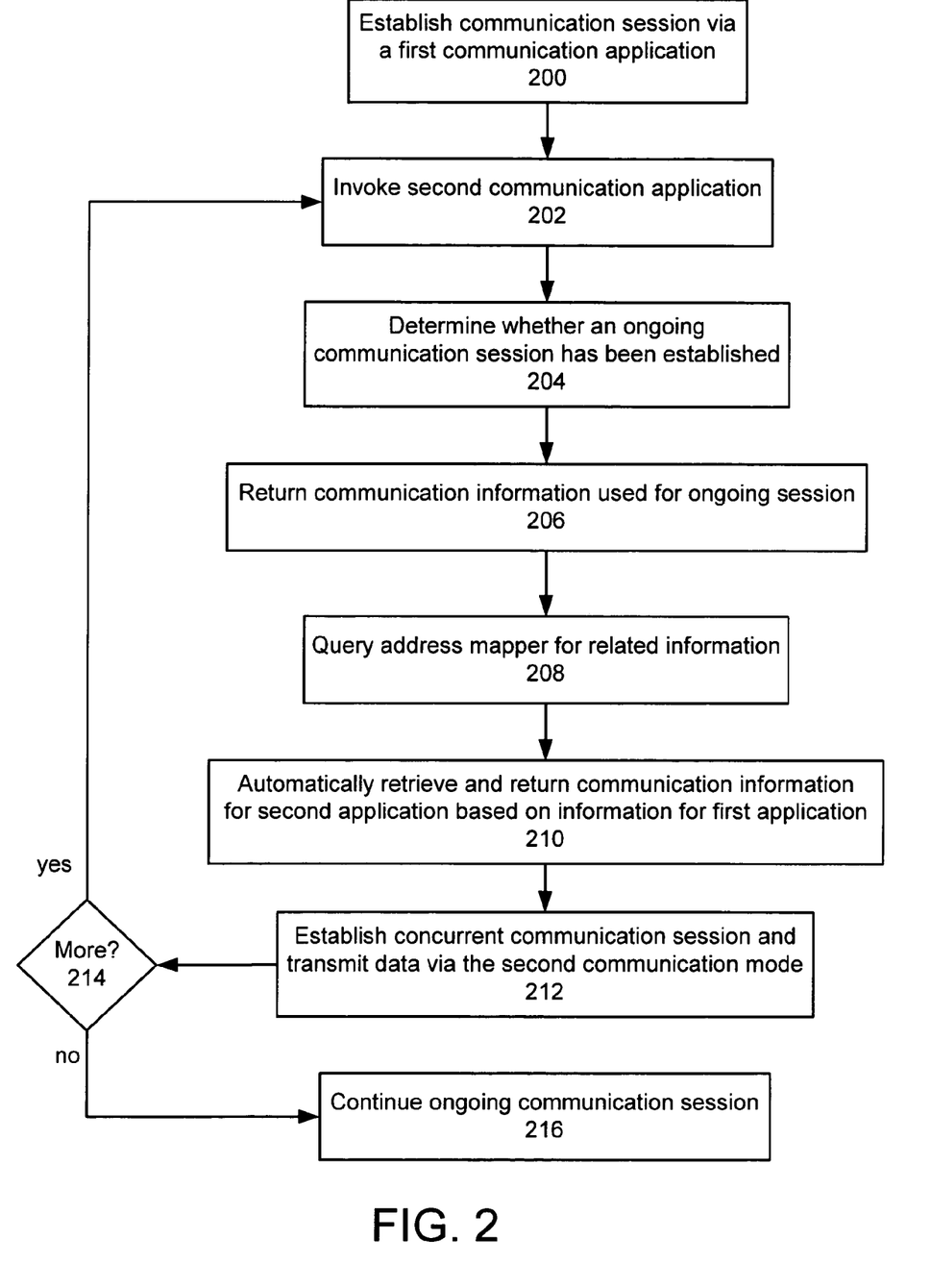
FIG. 2 is a flowchart illustrating a method for integrating a plurality of communication mechanisms utilizing related addressing information in accordance to a preferred embodiment of the present invention.

FIG. 2 is a flowchart illustrating a method for integrating a plurality of communication mechanisms utilizing related addressing information in accordance to a preferred embodiment of the present invention. The process begins at step 200, when the user of the communication device establishes a communication session with a recipient via one of the communication applications, e.g., phone call 110a. Presumably, the user provides the appropriate address information needed, e.g., phone number, to establish the session with the recipient using the chosen communication application.

At some point during the session, the user wishes to transmit data to the recipient, or someone associated with the recipient, utilizing another communication application, e.g., email 110b, and invokes the second communication application 110b (step 202) in order to facilitate the establishment of a second communication session concurrent with the already established communication session. In one embodiment, the user directly invokes the second communication application 110b, by pressing a softkey corresponding to the application 110b, for example. In another embodiment, the user submits a data transmission request to the device 100 and selects the data to transmit. In response, the device 100 automatically invokes the appropriate communication application to handle the selected data. For example, if the user submits a request to transmit data and selects an image file to transmit, the device 100 automatically invokes the MMS application 110d or email application 110b.

It is important to note at this time that FIG. 2 illustrates the integration process from the perspective of the user's communication device and that the device allows the user to invoke the second communication application 10b in step 202. Nevertheless, if the recipient's communication device is similarly enabled, the recipient can also initiate and establish the concurrent communication session by invoking the second communication application supported by the recipient's device. Accordingly, the ability to perform step 202 is not limited to the party who established the first communication session, i.e., the user. If both the user and the recipient are utilizing communication devices enabled by the present invention, either party can transmit data to the other utilizing more than one communication application simultaneously.

Referring again to FIG. 2, once the second communication application 110b has been invoked, it queries the communication monitor 132 to determine whether an ongoing communication session has been established in step 204. If an ongoing session exists, the communication monitor 132 returns the communication information used to establish the ongoing session with the recipient in step 206. For example, if the ongoing session is a phone call, the monitor 132 might return the phone number, or some representation associated with the phone number, used to establish the call. The second application 10b then takes the communication information returned from the monitor 132 and queries the address mapper 134 for the related communication information necessary to establish the concurrent session with the recipient in step 208. Such a query includes the communication information used to establish the ongoing session as an input parameter and the related communication information for the second communication application as an output parameter.

Figure 3:
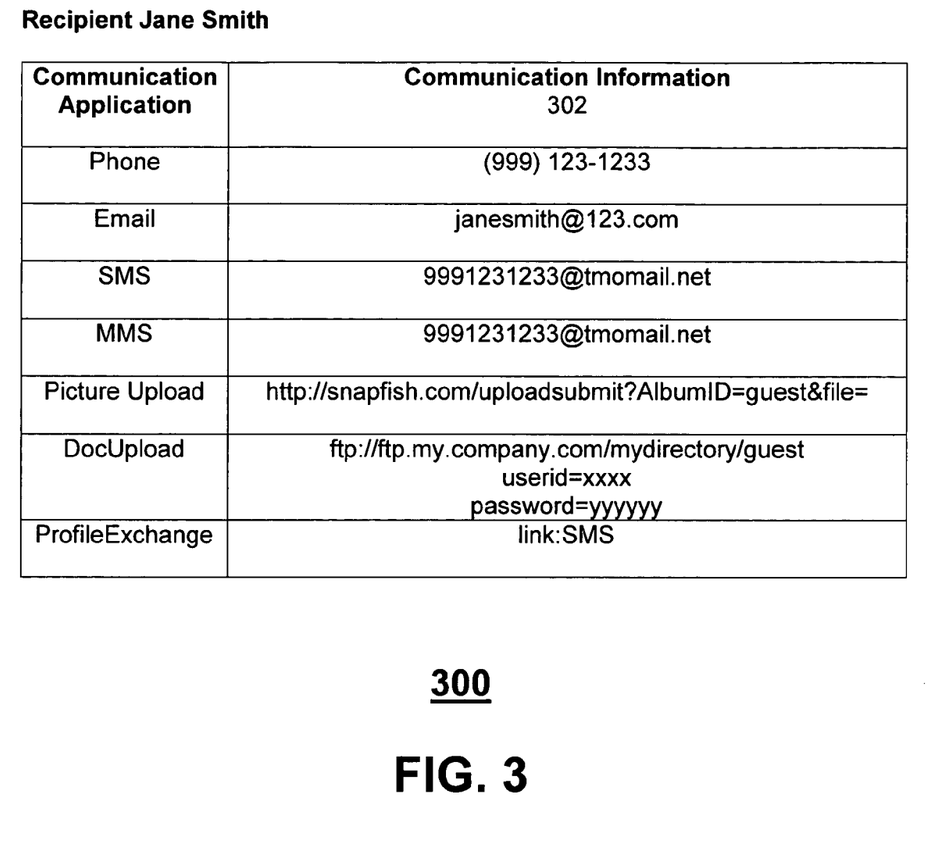
FIG. 3 is a schematic representation of an exemplary profile.

In step 210, the address mapper 134 retrieves and returns the related address information by accessing a plurality of profiles 142 (FIG. 1) stored in memory 140. In a preferred embodiment, each profile 142 is associated with a data transmission recipient, as well as with the device's user. FIG. 3 is a schematic representation of an exemplary profile 300 for a recipient, Jane Smith. The profile 300 includes any communication information 302, e.g., address and connection setup information, needed to establish any supported mode of communication with the associated recipient. For example, Jane Smith's profile 300 indicates that she can be called at (999) 123-1233, and that she allows others to upload pictures to her account at SnapFish into her "guest" folder. Moreover, she allows others to upload documents to her company's ftp server into her guest subdirectory. A guest userid and password is provided in an encrypted format.

The communication information 302 can be specific to the recipient or to a communication device associated with that recipient or to an individual or organization associated with recipient. For example, communication information 302 specific to the recipient includes the email address of the recipient and the recipient's personal website URL, while communication information 302 specific to the device includes the device's phone number and the IP address associated with the device. Communication information 302 specific to an associated individual or organization can include the phone number of the recipient's supervisor, or the ftp server address for the recipient's employer, etc. What should be clear is that the recipient is allowed to define the related communication information 302 in the profile 300 in whatever manner he or she wishes. Note that the profile 300 includes dynamic, as well as static addressing information. An example of a dynamic address includes an IP address dynamically assigned to a device using DHCP for IP address assignment. In a preferred embodiment, the plurality of profiles 300 corresponds to the device's preexisting address book.

A profile 300 can be populated manually by the user keying in the relevant data. Nevertheless, frequently the user is not aware of all the communication information for a recipient. For example, the user may know a recipient's phone number, but not the recipient's email address. Thus, the profile 300 for that recipient will be incomplete and the user must query the recipient for the missing information. If, however, the recipient's device is one that incorporates the present invention, the address mapper 134 can automatically populate the profile 300 for a recipient during a communication session with that recipient.

Figure 4:
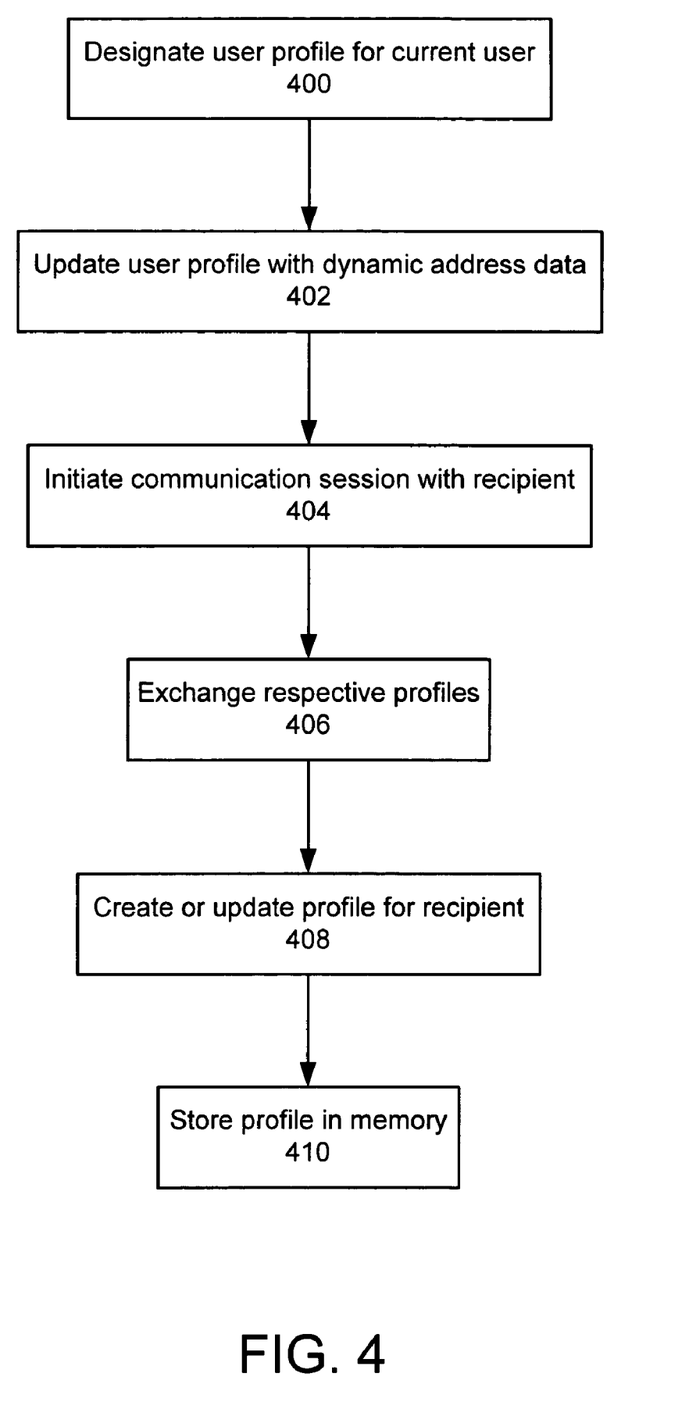
FIG. 4 is a flowchart illustrating a process for automatically populating a recipient profile from a recipient device in accordance to a preferred embodiment of the present invention.

FIG. 4 is a flowchart illustrating a process for automatically populating a recipient profile 300 from a recipient device in accordance to a preferred embodiment of the present invention. In step 400, the user designates his or her user profile, and in step 402, the address mapper 134 updates any dynamic address information for the user profile 300. In step 404, the user initiates the first communication session with the recipient. Once the communication session is established, the user device and the recipient device exchange their respective profiles 300 in step 406, via a transport such as SMS, for example. The exchange can either be automatic or in response to a prompt asking whether such an exchange is desirable. The profile 300 received by the user is used to create a profile or to update an existing profile 300 for the recipient in step 408, while the recipient does the same with the profile 300 received from the user. In step 410, the newly populated or updated profile 300 is stored in memory 140.

Referring again to FIG. 2, once the address mapper 134 retrieves and returns the appropriate related communication information to the second communication application 110b (step 210), the second communication application 110b automatically uses the returned communication information to establish the concurrent communication session and transmits the data by the second communication mode in step 212. In certain circumstances, the communication information returned for a recipient might include several entries. For example, the recipient may have more than one related email address, a personal address, a business address, and the address of the recipient's supervisor. Here, the address mapper 134 will display to the user the addresses and will then allow the user to select the appropriate address. Once the user makes his or her selection, the communication application 110b automatically uses the selected address information to establish the connection and transmits the data (step 212). If the user would like to invoke another communication application (step 214), steps 202 through 212 are repeated. Otherwise, the ongoing communication session continues normally (step 216).

It is important to note that while the second communication application 110b is interacting with the integration module 130 to automatically retrieve the communication information needed to establish the concurrent communication session, the first ongoing communication session continues uninterrupted. Moreover, because the communication application 110b automatically receives the related communication information it needs, the user is not required to know or provide such information.

Figure 5A:
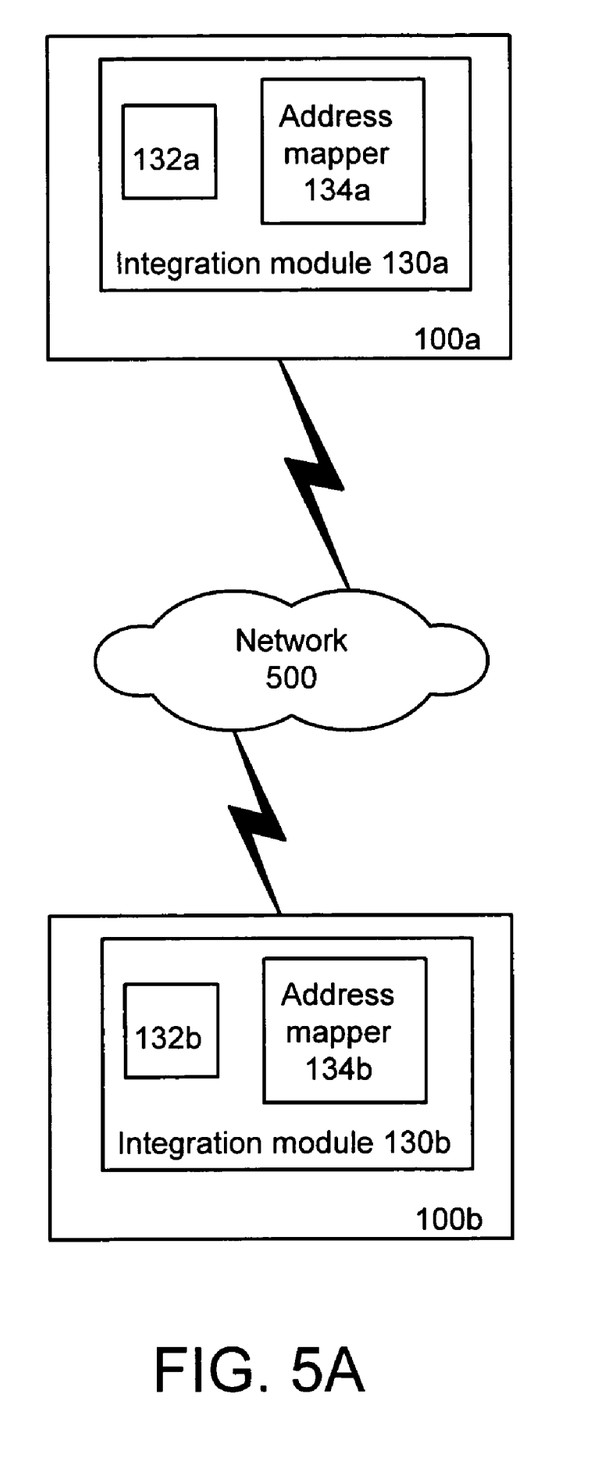
FIGS. 5A-5C illustrate different system architecture for the preferred embodiment of the present invention.

In the above described preferred embodiment, the device 100 includes a local address mapper 134 and memory 140 for storing the profiles 142. FIG. 5A illustrates one system architecture utilizing two devices 100a, 100b with this configuration. In this system, both devices 100a, 100b connect to a network 500, such as the Internet. The devices 100a, 100b are able to manage the networking between themselves and use their respective address mappers 134a, 134b for address mapping. In this embodiment, the devices 100a, 100b can exchange profiles automatically thereby enabling the automatic profile population feature described above.

Figure 5B:
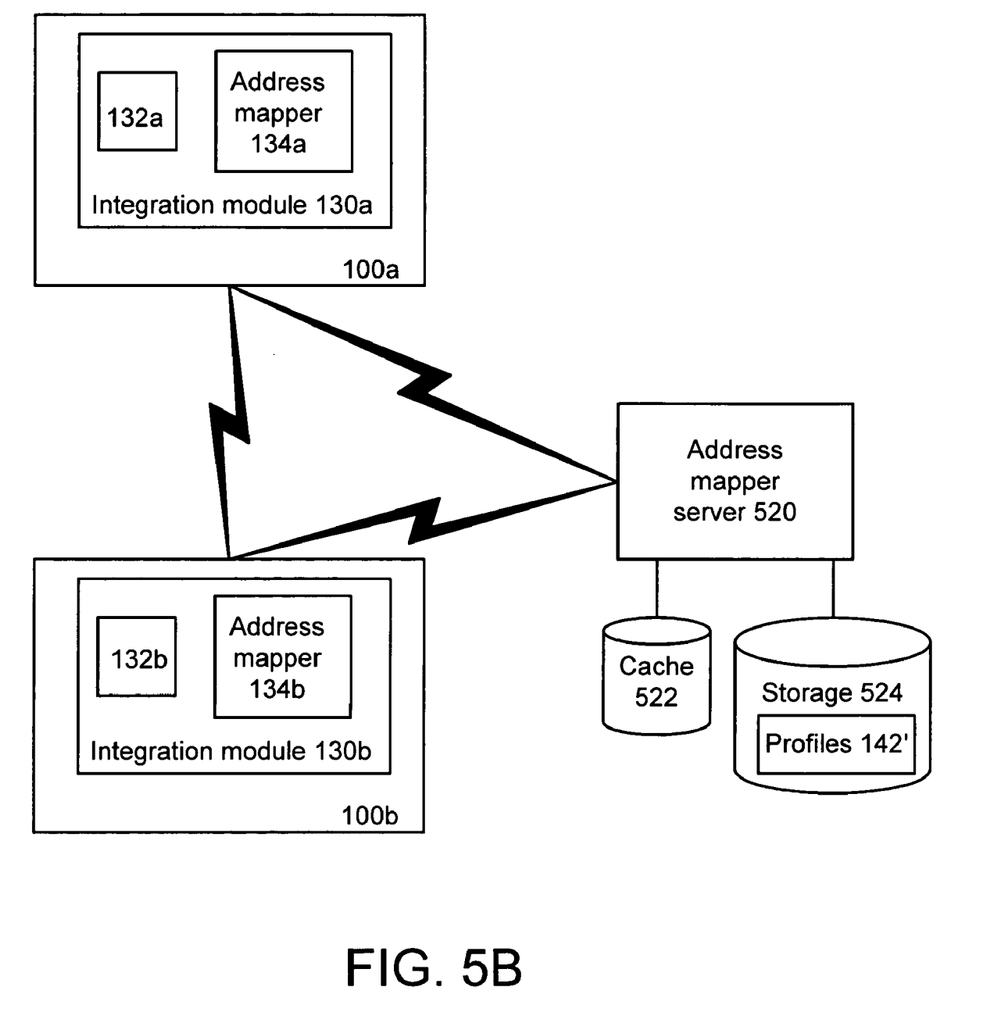

In FIG. 5B, another system architecture is depicted where devices 100a, 100b use an Address Mapper Server 520 to store profiles 142' and to process mapping requests. The local address mapper 134a, 134b in each device 100a, 100b preferably manages the interaction between the device 100a, 100b and the address mapper server 520. By storing profiles 142' on a separate server 520, the device's memory 140 is preserved. While FIG. 5B illustrates a single server 520, those skilled in the art would readily appreciate that multiple servers can be utilized by multiple devices 100a, 100b.

Figure 5C:
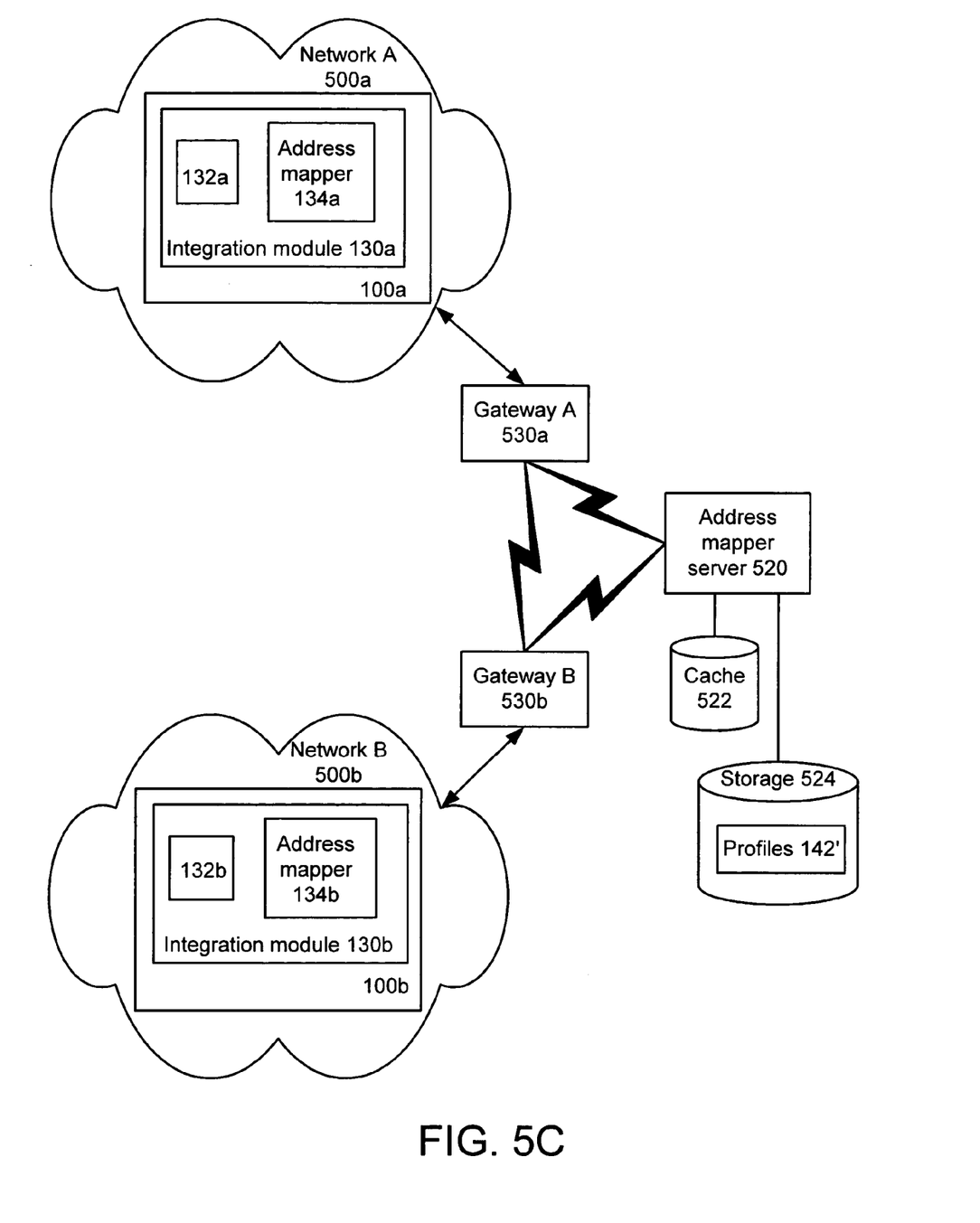

In FIG. 5C, a third system architecture is depicted where the devices 100a, 100b are not connected to a common network, but rather can only be addressed via a gateway 530a, 530b using an addressing scheme that enables each device 100a, 100b to be addressed. For example, a WAP gateway allows WAP enabled mobile phones to access data on the Internet, and allows Internet connected devices to send messages to the WAP enabled mobile phone. In this system, each device 100a, 100b send requests to the address mapper server 520 through the associated gateway 530a, 530b using the network protocol of the device's network 500a, 500b. The gateway 530a, 530b routes the request to the server 520 using the protocol of the backbone network (not shown), e.g., TCP/IP. Responses from the server 520 are returned to the gateway 530a, 530b, which routes the response to the device 100a, 110b.

Through aspects of the present invention, address and connection setup information for all communication mechanisms supported by a device are integrated. The communication device 100 according to the preferred embodiment allows the user to initiate a communication session with the recipient using a particular mode of communication. If data needs to be exchanged using a second mode of communication during the session, the communication information for the second mode is provided automatically. Accordingly, the user is not required to know more than one address for the recipient because the device automatically associates the necessary communication information to manage all other modes of communication supported by the device. In addition, the information exchange using the second mode of communication occurs concurrently with the initial communication session. Thus, the user's initial communication session is not interrupted.

Although the present invention has been described in accordance with the embodiment shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for transmitting data utilizing a plurality of communication applications simultaneously in a communication device supporting the plurality of communication applications, the method comprising:

establishing a first communication session between a user of the communication device and a recipient via a first communication application supported by the communication device;

invoking a second communication application to transmit data to the recipient via the second communication application during a communication session concurrent with the first communication session, the second communication application invoked in response to user input representing at least one of requesting the invoking of the second communication application and submitting a data transmission request without specifying any recipient's communication information; and in response to invoking the second communication application, automatically retrieving, from a profile corresponding to the recipient, communication information including an address related to the recipient and necessary to establish the concurrent communication session with the recipient via the second communication application.

2. The method of claim 1 further comprising:
transmitting data to the recipient via the second communication application while the first communication session continues uninterrupted.

3. The method of claim 2 further comprising:
prior to transmitting data to the recipient, returning the related communication information to the second communication application, wherein the second communication application uses the related communication information to establish the concurrent communication session.

4. The method of claim 1, wherein retrieving communication information further includes:
determining whether the first communication session is ongoing;
returning communication information used to establish the first ongoing session; and
utilizing the returned communication information to retrieve the related communication information.

5. The method of claim 1, wherein retrieving communication information further includes:
retrieving the related communication information from a profile corresponding to the recipient, wherein the profile includes communication information necessary to establish a connection with the recipient via any of the plurality of supported communication applications.

6. The method of claim 5, wherein the profile is stored in a database in memory in the communication device.

7. The method of claim 5, wherein the profile is stored in a database in a remote server accessible by the communication device.

8. The method of claim 5, wherein retrieving communication information further includes:
submitting a query to retrieve the related communication information, wherein the query includes, as an input parameter, communication information used to establish the first communication session via the first communication application;
identifying the profile corresponding to the recipient using the input parameter; and
selecting, from the identified profile, the appropriate communication information necessary to support a connection via the second communication application.

9. The method of claim 5 further including:
after establishing the first communication session receiving a profile corresponding to the recipient from the recipient's communication device;
automatically updating an existing profile for the recipient, if one exists; and
storing the recipient's profile in memory.

10. The method of claim 9 further comprising:
requesting the recipient's profile from the recipient's device prior to receiving a profile corresponding to the recipient.

11. The method of claim 9 further comprising:
transmitting a profile corresponding to the user to the recipient device.

12. The method of claim 1, wherein invoking a second communication application includes:
initiating by the user the second communication application directly.

13. The method of claim 1, wherein invoking a second communication application includes:
requesting by the user to transmit data;
selecting by the user data to be transmitted; and
automatically invoking the second communication application suitable for transmitting the data selected by the user.

14. The method of claim 1, wherein the communication information includes one or more phone numbers, one or more email addresses and dynamically assigned IP addresses.

15. A computer readable storage medium containing program instructions for transmitting data utilizing a plurality of communication applications simultaneously in a communication device supporting the plurality of communication applications, the program instructions for:

* establishing a first communication session between a user of the communication device and a recipient via a first communication application supported by the communication device;
* invoking a second communication application to transmit data to the recipient via the second communication application during a communication session concurrent with the first communication session, the second communication application invoked in response to user input representing at least one of requesting the invoking of the second communication application and submitting a data transmission request without specifying any recipient's communication information; and
* in response to invoking the second communication application, automatically retrieving, from a profile corresponding to the recipient, communication information including an address related to the recipient and necessary to establish the concurrent communication session with the recipient via the second communication application.

16. The computer readable storage medium of claim 15 further including:

transmitting data to the recipient via the second communication application while the first communication session continues uninterrupted.

17. The computer readable storage medium of claim 16 further comprising:

prior to the transmitting instruction, returning the related communication information to the second communication application, wherein the second communication application uses the related communication information to establish the concurrent communication session.

18. The computer readable storage medium of claim 15 wherein the retrieving instruction further includes:

* determining whether the first communication session is ongoing;
* returning communication information used to establish the first ongoing session; and
* utilizing the returned communication information to retrieve the related communication information.

19. The computer readable storage medium of claim 15, wherein the retrieving instruction further includes:

retrieving the related communication information from a profile corresponding to the recipient, wherein the profile includes communication information necessary to establish a connection with the recipient via any of the plurality of supported communication applications.

20. The computer readable storage medium of claim 19, wherein the profile is stored in a database in memory in the communication device.

21. The computer readable storage medium of claim 19, wherein the profile is stored in a database in a remote server accessible by the communication device.

22. The computer readable storage medium of claim 19, wherein the retrieving instruction further includes:

* submitting a query to retrieve the related communication information, wherein the query includes, as an input parameter, communication information used to establish the first communication session via the first communication application;
* identifying the profile corresponding to the recipient using the input parameter; and
* selecting, from the identified profile, the appropriate communication information necessary to support a connection via the second communication application.

23. The computer readable storage medium of claim 19 further including:

* after establishing the first communication session, receiving a profile corresponding to the recipient from the recipient's communication device;
* automatically updating an existing profile for the recipient, if one exists; and
* storing the recipient's profile in memory.

24. The computer readable storage medium of claim 23 further comprising:

requesting the recipient's profile from the recipient's device prior to receiving a profile corresponding to the recipient.

25. The computer readable storage medium of claim 23 further comprising:

transmitting a profile corresponding to the user to the recipient device.

26. The computer readable storage medium of claim 15, wherein the invoking instruction includes:

initiating by the user the second communication application directly.

27. The computer readable storage medium of claim 15, wherein the invoking instruction includes:

* requesting by the user to transmit data;
* selecting by the user data to be transmitted; and
* automatically invoking the second communication application suitable for transmitting the data selected by the user.

28. The computer readable storage medium of claim 15, wherein communication information includes phone numbers, email addresses and dynamically assigned IP addresses.

29. A communication device supporting a plurality of communication applications comprising:

* means for allowing a user to establish a first communication session with a recipient via a first communication application supported by the communication device;
* means for invoking a second communication application to transmit data to the recipient via the second communication application during a communication session concurrent with the first communication session, the second communication application invoked in response to user input representing at least one of requesting the invoking of the second communication application and submitting a data transmission request without specificity any recipient's communication information; and
* an integration module, responsive to the means for invoking, for automatically retrieving, from a profile corresponding to the recipient, communication information including an address related to the recipient and necessary to establish the concurrent communication session with the recipient via the second communication application.

30. The device of claim 29 further comprising means for transmitting data to the recipient via the second communication application while the first communication session continues uninterrupted.

31. The device of claim 29, wherein the integration module includes a communication monitor for receiving a query from the second communication application to determine whether the first communication session is ongoing and for returning communication information used to establish the first ongoing session.

32. The device of claim 31, wherein the integration module further includes an address mapper for receiving a query from the second communication application to retrieve the related communication information from a profile corresponding to the recipient, wherein the profile includes communication information necessary to establish a connection with the recipient via any of the plurality of supported communication applications.

33. The device of claim 32, wherein the query includes, as an input parameter, the communication information used to establish the first communication session via the first communication application, and wherein the address mapper identifies the profile corresponding to the recipient using the input parameter and selects, from the identified profile, the appropriate communication information need to support a connection via the second communication application.

34. The device of claim 32, wherein the address mapper further includes means for receiving a profile corresponding to the recipient from the recipient's communication device, means for updating an existing profile for the recipient, if one exists, and means for storing the recipient's profile in memory.

35. The device of claim 34, wherein the address mapper is in communication with a remote server.

36. The device of claim 35, wherein the remote server includes memory for storing the recipient's profile and means for retrieving related communication information in response to receiving the query from the address mapper.

37. The device of claim 35, wherein the address mapper is in communication with the remote server via a gateway.

38. A method for exchanging data utilizing a plurality of communication applications simultaneously in at least two communication devices, wherein each of the at least two communication devices supports the plurality of communication applications, the method comprising:

establishing a first communication session between a first party using a first communication device and a second party using a second communication device via a first communication application supported by the first communication device;

invoking a second communication application in either the first or second communication device in response to user input representing at least one of requesting the invoking of the second communication application and submitting a data transmission request without specifying any recipient's communication information by a sending party to transmit data to a receiving party via the second communication application during a communication session concurrent with the first communication session, wherein the sending party is either the first party or the second party and the receiving party is a counterpart of the sending party;

in response to invoking the second communication application by the sending party, automatically retrieving communication information from a profile corresponding to the receiving party, the communication information including an address related to the receiving party and necessary to establish the concurrent communication session with the receiving party via the second communication application; and transmitting data to the receiving party via the second communication application while the first communication session continues uninterrupted.

* * * * *